Sept. 27, 1966 P. W. MARTIN 3,275,116
AIR POWERED TOOL WITH OVERLOAD CUTOFF
Filed Oct. 12, 1964 2 Sheets-Sheet 1
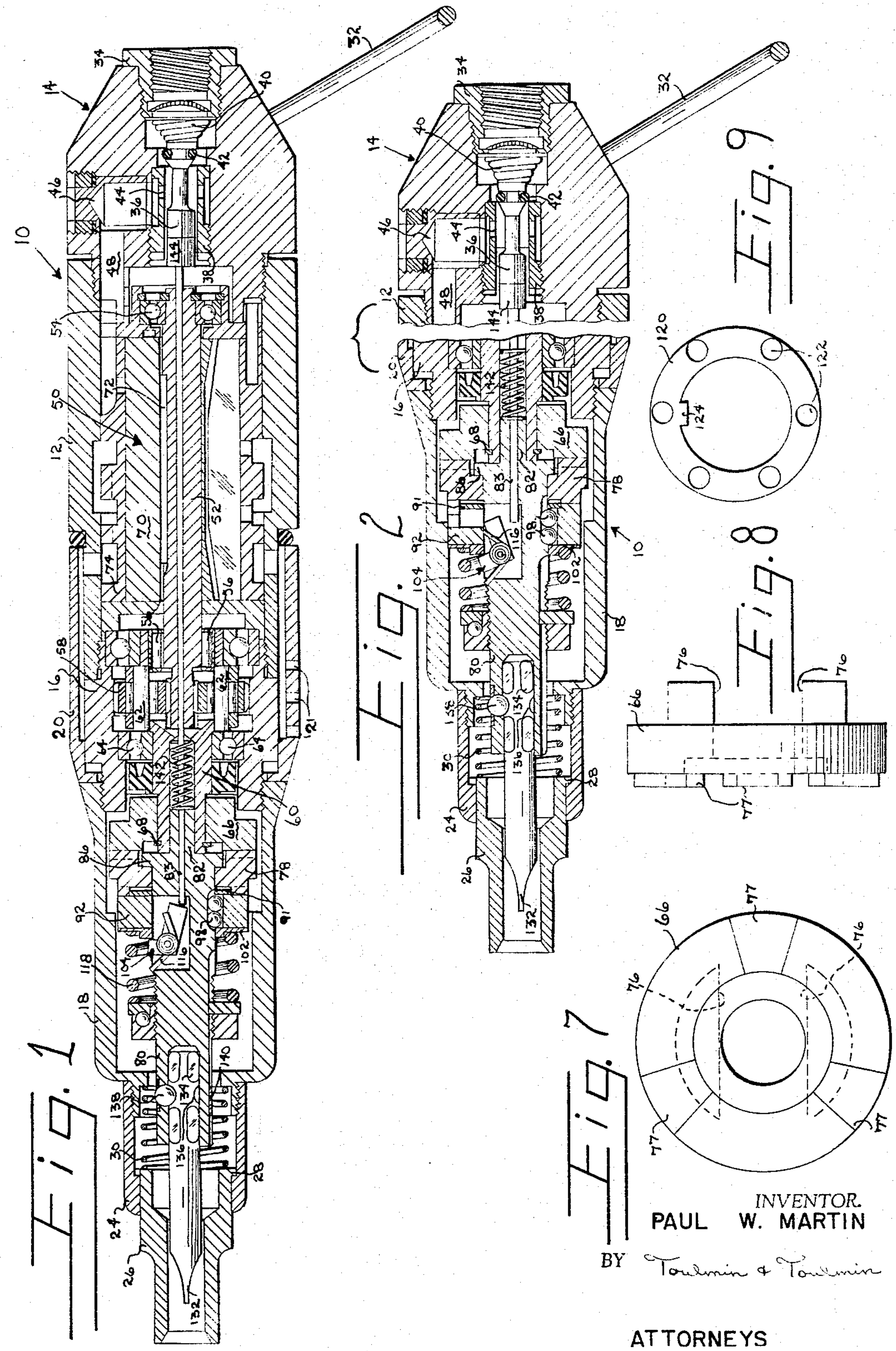
INVENTOR.
PAUL W. MARTIN
BY Toulmin & Toulmin
ATTORNEYS AIR POWERED TOOL WITH OVERLOAD CUTOFF
Filed Oct. 12, 1964 2 Sheets-Sheet 2
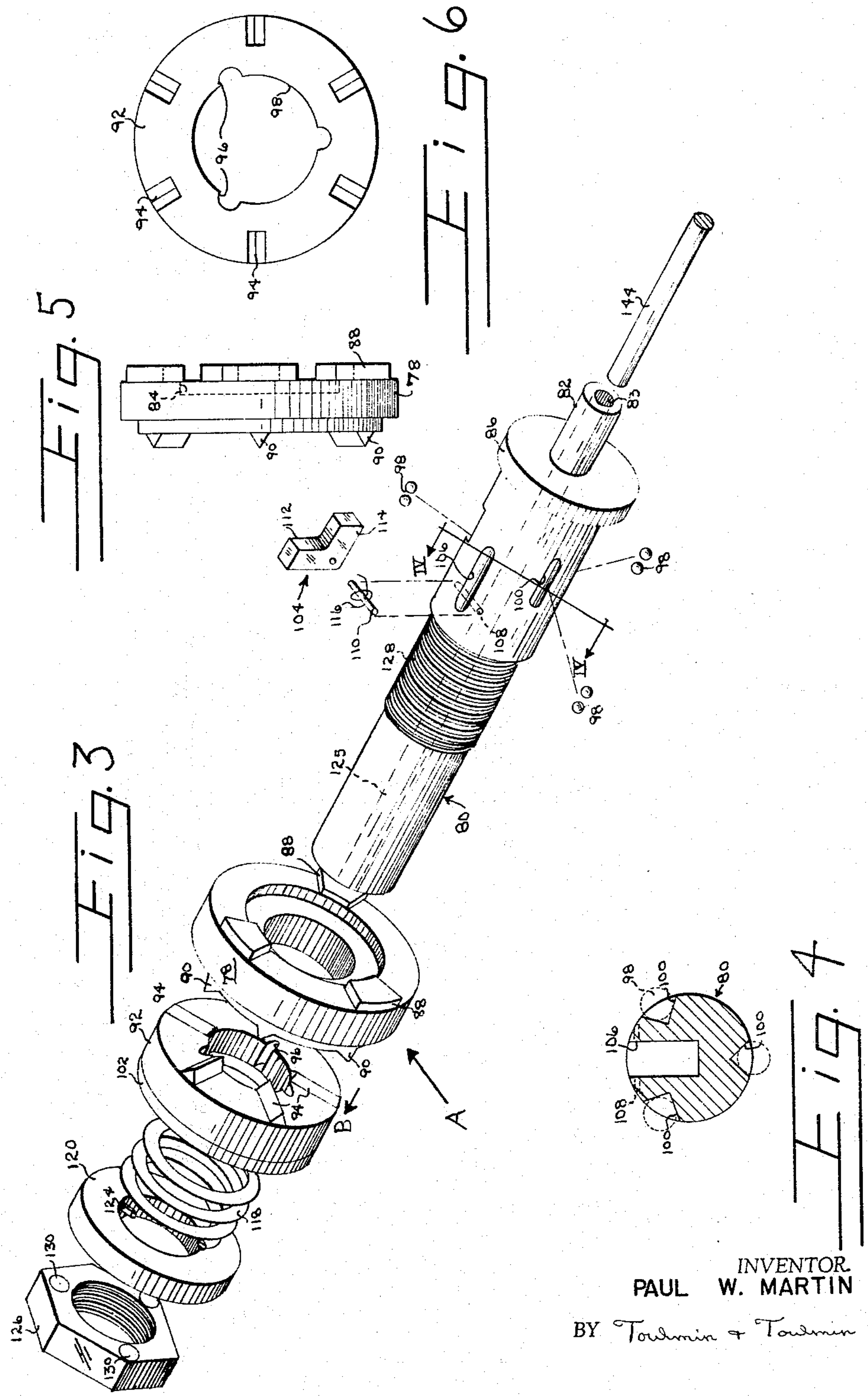
INVENTOR
PAUL W. MARTIN
BY Toulmin & Toulmin
ATTORNEYS 3,275,116
AIR POWERED TOOL WITH OVERLOAD CUTOFF
Paul W. Martin, Springfield, Ohio, assignor to The Airetool Manufacturing Company, Springfield, Ohio, a corporation of Ohio
Filed Oct. 12, 1964, Ser. No. 403,114
12 Claims. (Cl. 192—150)

This invention relates to an air power tool and is particularly concerned with a means for shutting off the supply of air to the power tool when a predetermined amount of torque resistance is met by the revolving member of the air tool.

Prior means for automatically shutting off the air supply in air operated tools when a predetermined amount of torque resistance is met by the tool are known; however, applicant knows of none which utilize the simplified construction of this invention.

A primary object of this invention is to provide an air operated tool with means for automatically shutting off the supply of air to the tool when a predetermined amount of torque resistance is met by the tool.

A further object of this invention is to provide such a tool with dependable and accurate means for controlling the torque at which the supply of air will be automatically shut off.

One such prior means for automatically shutting off the supply of air to the power tool when a predetermined torque resistance is met by the working member of the tool is shown in the patent to Eckman, No. 2,964,151, which issued on December 13, 1960.

In the above patent there is a first member which telescopes inside the rotating spindle and has a sear member or pivot member thereon. A second pivot member is located on a tubular clutch member, which pivot member is actuated by an expanding clutch member when a predetermined torque resistance is met by the rotating tool spindle. Upon being actuated by the expanding clutch member, the second pivot member moves the first pivot member from engagement with a shoulder on the spindle permitting the first member to telescope within the spindle and advance towards the tool carried by the tool spindle. Upon so advancing, a spring member urges a valve member to close thereby shutting off the supply of air to the motor driving the spindle.

In applicant's device, there is only one pivot member which is carried by the spindle and this pivot member is actuated by an expanding clutch member when a predetermined torque resistance is met by the rotating tool carried by the spindle. By this construction, a greatly simplified construction is obtained. Control over the predetermined torque resistance at which the power is shut off is also enhanced and difficulties encountered in repair are also more easily handled.

These and other objects and advantages will become apparent upon reading of the following specification and accompanying drawings in which:

FIGURE 1 is a side elevational view in section showing a tool embodying the invention with the trip for controlling the shut off of fluid in position to open the valve to the fluid motor;

FIGURE 2 is a side elevational view showing a position of the tool of FIGURE 1 with the trip in position for controlling the shutting off of fluid to the motor when a predetermined torque is reached in the driving clutch mechanism;

FIGURE 3 is an exploded perspective view of a portion of FIGURE 1 showing the location of the trip mechanism in the bit socket;

FIGURE 4 is a cross sectional view of the bit socket taken along the lines 4—4 of FIGURE 3;

FIGURE 5 is a side view of the slip clutch member looking from side A of FIGURE 3;

FIGURE 6 is an end view of the mating slip clutch member looking from side B of FIGURE 3;

FIGURE 7 is a front view of the clutch member which is driven by the spider;

FIGURE 8 is a side view of FIGURE 7; and

FIGURE 9 is a front view of the lock washer showing the recesses thereon.

Referring to the drawings in more detail, FIGURE 1 shows an air operated tool generally designated 10 which is used for driving screws. While the specific embodiment selected to portray the invention is explained in relation to a screw driver, it is understood that the apparatus disclosed herein could be conveniently employed on other air operated tools, such as air wrenches or expanders or the like.

The tool 10 is made up of a case 12 into which is threadedly secured a valve coupling member generally designated 14. At the other end of case 12 there is a gear case 16 which is threadedly secured to case 12. A clutch housing 18 is also threadedly secured to the gear case 16 after an exhaust sleeve 20 is placed in position as shown. A suitable O-ring 22 is placed between the case 12 and exhaust sleeve 20 which has the usual exhaust ports 21 therein.

At the forward end of the tool there is retainer 24 which is threadedly secured to the forward end of clutch housing 18. A suitable screw finder 26 having a shoulder 28 thereon is suitably retained in retainer 24 and is urged thereagainst by finder spring 30.

At the right end of the tool as shown in FIGURE 1, a suitable suspension bail 32 is secured to the valve coupling member 14. A valve bushing 34 is threadedly retained in valve coupling 14 and has internal threads therein which are used for attaching it to a threaded conduit which connects the tool with a source of compressed air.

A valve 36 is slidably mounted in valve seat 38 which in turn is threadedly secured in the valve coupling member 14 as shown in FIGURE 1. A valve spring 40 urges the valve 36 into the closed position and an O-ring 42 provides the necessary seal at the valve seat.

The valve seat 38 is provided with a passage 44 which comunicates with an air regulator 46 which is threadedly secured in valve coupling member 14. From the regulator an air passage 48 communicates with a standard air driven motor generally designated 50.

The motor has a drive shaft 52 which is supported at its rearward end by a bearing 54 and is rotatably supported at its forward end by bearing 56. The leftmost end of drive shaft 52, as shown in FIGURE 1, is operatively connected to planet gear 58 which is connected to gear spider 60 by means of three planet pins 62 which are spaced 120 degrees apart.

A suitable bearing 64 is provided for gear spider 60. A clutch member 66 is fixed to rotate with gear spider 60 and the clutch member is retained on the spider by a lock ring 68. The motor 50 has a rotor 70 which is fixed to rotate with drive shaft 52 by a key 72 and the rotor rotates in cylinder 74. The clutch member 66 has two flats 76 thereon, as shown in FIGURES 7 and 8, and these flats match with mating flats on the gear spider 60, and thus clutch member 66 is fixed to rotate with the gear spider.

When the valve 36 is lifted off its seat a source of air under pressure travels through port 44, regulator 46, and passageway 48 into the motor 50. After a suitable reduction in speed the output of motor 50 is transferred to clutch member 66 as previously explained.

The operation of motor 50 and the transmission of power to clutch member 66 is standard and known and does not form a part of this invention.

The clutch member 66 as seen in FIGURES 7 and 8 has three projections 77 extending therefrom which are radial segments which form the driving contact to the adjacent slip clutch member 78. Slip clutch 78 is rotatably mounted on bit socket or tool spindle 80 which has a cylindrical projection 82 extending therefrom, as shown in FIGURES 1 and 3, and which is rotatably supported in a bore in gear spider 60. The cylindrical projection has an aperture 83 therein in which a push rod slides.

The slip clutch 78 has an annular shoulder 84 therein as shown in FIGURE 5 and this shoulder abuts against flange 86 on the bit socket 80. The slip clutch 78, as seen in FIGURES 3 and 5, has three lugs 88 which are radial segments similar to those on clutch member 66, and these lugs provide the driving contact between the pertaining clutch members.

On the side of slip clutch 78 which is opposite the lugs 88 there are provided a plurality of six equally spaced lugs 90 as shown in FIGURES 3 and 5. The lugs have an included angle of 60 degrees and have sharp hardened edges. These hardened edges are important in obtaining the accurate shut off of the air supply at the predetermined torque resistance met by the rotating tool.

On the same side as the lugs 90 there is provided a washer 91 which is seen in FIGURE 1. Adjacent to slip clutch 78 there is another slip clutch 92 which has six equally spaced lugs 94 thereon which are similar to lugs 90 and are shown in more detail in FIGURE 6.

There are three arcuately shaped recesses 96 formed on the internal diameter 98 of clutch member 92 as shown in FIGURES 3 and 6. These recesses 96 partially house ball bearings 98 which are also partially housed in recesses 100 of bit socket 80. There are three such recesses 100 which are equally spaced around the diameter of bit socket 80 as shown in FIGURE 4. In this manner slip clutch 92 is axially slidable on bit socket 80 and is fixed to rotate therewith.

After the slip clutch member 78 is placed on bit socket 80 and washer 91 is placed in position slip clutch member 92 and the ball bearings 98 are positioned in the pertaining recesses on bit socket 80. A suitable washer 102 is then placed behind slip clutch member 92 to retain the balls therein in conjunction with washer 91.

The trip member generally designated 104 is positioned in a cavity 106 which is formed in bit socket 80 as shown in FIGURES 3 and 4. A suitable hole 108 is drilled through bit socket 80 and receives a pin 110 on which the trip member 104 is pivotally mounted. The trip member has an upper leg 112 and a lower leg 114 as shown in FIGURE 3. A suitable spring 116 bears against the cavity 106 and trip member 104 to urge the trip member 104 in a clockwise direction. After the trip member 104 is in position a suitable regulating spring 118 is positioned against the washer 102 and is followed by a lock washer 120 as shown in FIGURES 3 and 9.

The side of the washer 120 away from spring 118 has six equally spaced recesses 122 therein as shown in FIGURE 9. The lock washer 120 is also provided with a lug 124 which fits into a mating keyway 125 on bit socket 80. The spring and lock washer are retained on the threads 128 of bit socket 80 by a hexagonal nut 126. The nut 126 has three equally spaced ball bearings 130 secured thereto on the face adjacent to the recesses 122 on the lock washer, and these ball bearings 130 fit into the recesses 122 and keep the nut 126 from turning except when making the appropriate adjustment of compression on spring 118, which regulates the predetermined torque resistance at which clutch member 92 will be disengaged from clutch member 78.

The leftmost side of bit socket 80 as viewed in FIGURE 1 has a hexgonal recess therein which receives screw driver bit 132 which has a cooperating hexagonal surface 134. The bit has an annular recess 136 thereon into which a ball bearing 138 is urged by retaining split ring 140 to retain the screw driver bit in the bit socket 80 against accidental removal.

When the screw driver is in the inoperative position clutch spring member 142 which is located in gear spider 60 abuts against a shoulder at one end thereof and against the extension 82 on the bit socket 80 to push bit socket 80 to the left and thereby separate the clutch members 78 and 66. Also, in the inoperative position a push rod 144 bears against the lower leg 114 of trip member 104.

When it is desired to use the device, the tool is connected to a source of air pressure and the tool is located above the work. In this case it would be a screw. Upon pressing down on the screw the bit 132 bears against the bit socket 80 and since trip member 104 is in the position shown in FIGURE 1, the lower leg 114 of the trip member pushes the push rod 144 to the right, thereby raising valve 36 off its seat, permitting air pressure to enter the tool and drive the motor 50 as previously described.

The clutch spring 142 normally separates the clutch members 78 and 66; however, when the tool is pushed downwardly on the work, the bit socket 80 moves to the right, as viewed in FIGURE 1, and clutch member 78 is brought into engagement with clutch member 66 after the time that the valve 36 is lifted off its seat. The motor then drives the bit 132 and as the screw in the example given is tightened, an increased torque resistance will be felt by the motor 50.

When the torque resistance builds up to a predetermined amount, slip clutch member 92 will move to the left, as viewed from FIGURE 1, and will overcome the resistance of regulating spring 118. In moving to the left slip clutch member 92 and washer 102 will bear against the upper leg 112 of the trip member 104, to thereby cause the lower leg 114 to rotate in a counter-clockwise direction. The lower leg 114 then rotates out of the way, permitting push rod 144 to advance to the left, as shown in FIGURE 2, permitting valve spring 40 to push valve member 36 upon its valve seat 38, thereby shutting off the supply of air to the tool.

By this construction the supply of air to the tool is shut off when a predetermined amount of torque is reached, and even though the tool is held downwardly on the part, no air will enter the tool. Upon removing the tool from the work the clutch spring 142 pushes the bit socket 80 to the left as viewed from FIGURE 1, thereby withdrawing push rod 144 from interfering with trip member 104 which is now urged in a clockwise direction by spring 116 to again position the trip member for the second operation. The right end of shaft 52 limits the extent of leftward movement of push rod 144.

FIGURE 2 shows the trip member when it is rotated in a counter-clockwise direction to permit the valve member to close.

It should be pointed out that the lugs 90 and 94 cooperate to push clutch member 92 to the left to actuate the pivot member 104. In the specific example disclosed, the relative movement of clutch member 92 away from clutch member 78 is $\frac{1}{16}$ inch with only $\frac{3}{64}$ inch being sufficient to actuate the pivot member. The sharp hardened steel edges of the lugs provide for a critical adjustment of the predetermined torque at which the lugs on the clutch member 78, in rotating, will slide on the engaging faces of the lug members 94 and push clutch member 92 to the left as viewed from FIGURE 1. In this respect, only a very small angular displacement is necessary to effect the pushing of clutch member 92 mentioned above. By the above arrangement an accurate control of the shut off of the supply of air to the motor is had to within plus or minus 1 inch-pound.

It will be understood that this invention is susceptible to modification in order to adapt it to different usages and conditions and accordingly, it is desired to comprehend such modifications within this invention as may fall within the scope of the appended claims.

What is claimed is:

1. A power tool comprising; a housing, a rotary air actuated motor within said housing, a passageway through which a supply of air under pressure is delivered to said motor, a valve for controlling the air through said passageway, means normally closing said valve to shut off said supply of air, a spindle adapted to be moved axially inwardly and outwardly of said housing under certain conditions of operation, rotation transmitting clutch means including an axially movable member between said motor and said spindle adapted to disengage at a predetermined torque resistance to rotation of said spindle, a valve opening member adapted to open said valve upon the axial inward movement of said spindle, and a trip member pivotally mounted on said spindle and operative to normally transmit the axial inward movement of said spindle to said valve opening member to open said valve, said axially movable member of said clutch means being adaptable to contact and release said trip member upon a predetermined resistance to rotation of said spindle permitting said means to close said valve upon the release of said trip member.

2. A power tool comprising; a housing, a rotary air actuated motor within said housing, a passageway through which a supply of air under pressure is delivered to said motor, a valve for controlling the air through said passageway, means normally closing said valve to shut off said supply of air, a spindle adapted to be moved axially inwardly and outwardly of said housing under certain conditions of operation, rotation transmitting clutch means including an axially movable member between said motor and said spindle adapted to disengage at a predetermined torque resistance to rotation of said spindle, a valve opening member adapted to open said valve upon the axial inward movement of said spindle, and one pawl member pivotally mounted on said spindle and having spring means to urge it to a first position for transmitting the axial inward movement of said spindle to said valve opening member to open said valve, said pawl member being movable to a second position permitting said means to close said valve, said axially movable member of said clutch means being adaptable to contact and move said pawl member to said second position upon a predetermined resistance to rotation of said spindle.

3. A power tool comprising; a housing, a rotary air actuated motor within said housing, a passageway through which a supply of air under pressure is delivered to said motor, a valve for controlling the air through said passageway, means normally closing said valve to shut off said supply of air, a spindle adapted to be moved axially inwardly and outwardly of said housing under certain conditions of operation, rotation transmitting clutch means between said motor and said spindle adapted to disengage at a predetermined torque resistance to rotation of said spindle, a valve opening member adapted to open said valve upon the axial inward movement of said spindle, and one pawl member pivotally mounted on said spindle and having a first leg and a second leg, spring means to urge said first leg into a first position in which the leg engages said valve opening member to transmit the axial inward movement of said spindle to said valve opening member to open said valve, said pawl member being movable to a second position in which said first leg is disengaged from said valve opening member permitting said means to close said valve, said clutch means being adaptable to engage said second leg and move said pawl member into said second position upon a predetermined resistance to rotation of said spindle.

4. The apparatus as claimed in claim 3 in which the valve opening member is a push rod which is axially movable in said spindle.

5. The apparatus as claimed in claim 4 further comprising means for permitting said first leg to return to said first position upon the axial outward movement of said spindle.

6. The apparatus as claimed in claim 5 further comprising means for adjusting the said resistance at which said clutch means will move said pawl member.

7. A power tool comprising; a housing, a rotary air actuated motor within said housing, a passageway through which a supply of air under pressure is delivered to said motor, a valve for controlling the air through said passageway, means normally closing said valve to shut off said supply of air, a spindle adapted to be moved axially inwardly and outwardly of said housing under certain conditions of operation and having a cavity on the perimeter thereof, a pawl member pivotally mounted in said cavity and having first and second legs and being adapted to move into first and second positions, spring means cooperating with said spindle and pawl member to urge said pawl member into said first position, a push rod axially movable in said spindle and having one end engaging said first leg when said pawl member is in said first position and having the other end engaging said valve to open said valve upon the axial inward movement of said spindle, and rotation transmitting clutch means between said motor and said spindle adapted to disengage at a predetermined torque resistance to rotation of said spindle, said clutch means being adaptable to engage said second leg and move said pawl member into said second position upon reaching said predetermined resistance thereby disengaging said first leg from said push rod enabling said means to close said valve.

8. The apparatus as claimed in claim 7 further comprising means for permitting said first leg to return to said first position upon the axial outward movement of said spindle.

9. The apparatus as claimed in claim 7 in which said clutch means comprises a first clutch member operatively connected with said motor, a second clutch member rotatably mounted on said spindle and adapted to engage and be driven by said first clutch member upon the axial inward movement of said spindle, a third clutch member mounted on said spindle to rotate therewith, axially movable thereon, and adapted to be driven by said second clutch member, and regulating spring means mounted on said spindle to resiliently maintain said third clutch member in driving engagement with said second clutch member.

10. A power tool comprising; a housing, a rotary air actuated motor within said housing, a passageway through which a supply of air under pressure is delivered to said motor, a valve for controlling the air through said passageway, means normally closing said valve to shut off said supply of air, a spindle adapted to be moved axially inwardly and outwardly of said housing under certain conditions of operation and having a cavity on the perimeter thereof, a pawl member pivotally mounted in said cavity and having first and second legs and being adapted to move into first and second positions, spring means cooperating with said spindle and said pawl member to urge said pawl member into said first position, a push rod axially movable in said spindle and having one end engaging said first leg when said pawl member is in said first position and having the other end engaging said valve to open said valve upon the axial inward movement of said spindle, rotation transmitting clutch means between said motor and said spindle adapted to disengage at a predetermined torque resistance to rotation of said spindle, said clutch means being adaptable to engage said second leg and move said pawl member into said second position upon reaching said predetermined resistance thereby disengaging said first leg from said push rod enabling said means to close said valve, said clutch means comprising a first clutch member operatively connected with said motor, a second clutch member rotatably mounted on said spindle and adapted to engage and be driven by said first clutch member upon the axial inward movement of said spindle, a third clutch member mounted on said spindle to rotate therewith, axially movable thereon, and adapted to be driven by said second clutch member, regulating spring means mounted on said spindle to resiliently maintain said third clutch member in driving engagement with said second clutch member and clutch spring means to resiliently urge said spindle outwardly of said housing to disengage said second clutch member from said first clutch member, and cooperating elements in said housing and on said other end of said push rod to limit the axial outward movement of said push rod when said clutch spring means urges said spindle outwardly thereby permitting said pawl member to return to said first position.

11. The apparatus as claimed in claim 10 in which said third clutch member axially shifts on said spindle upon reaching said predetermined resistance to engage said second leg and move said pawl member into said second position.

12. The apparatus as claimed in claim 10 in which said second and third clutch members have an equal number of equally spaced lugs on the perimeters thereof to provide the driving engagement therebetween, each said lug having faces extending outwardly from the pertaining clutch member and converging at a common radially aligned edge.

References Cited by the Examiner

UNITED STATES PATENTS

| | | | |
|---|---|---|---|
| 2,964,151 | 12/1960 | Eckman | 173—12 |
| 2,986,052 | 5/1961 | Eckman et al. | |
| 3,195,704 | 7/1965 | Linsker | 192—150 |

DAVID J. WILLIAMOWSKY, *Primary Examiner.*